Patented June 25, 1946

2,402,698

UNITED STATES PATENT OFFICE 2,402,698

CHEMICAL PROCESSES AND PRODUCTS

James H. Werntz, Wilmington, Del., assignor to E. I. du Pont de Nemours & Company, Wilmington, Del., a corporation of Delaware No Drawing. Application April 23, 1942, Serial No. 440,249

12 Claims. (Cl. 260—609)

This invention relates to a catalytic process and products therefrom and more particularly it relates to a process for the production of cyclic thiols and products therefrom.

This invention has as its object the preparation of certain new products derived from cyclic terpene compounds. Another object is to provide a new and improved method for the preparation of thiols derived from cyclic terpene compounds which process utilizes low-cost raw materials. Still another object is to provide a commercially practical process for the production of thiols from cyclic terpene compounds. Another object is to provide a process for the production of thiols from cyclic terpene compounds in high yields. Still another object is to provide a process for the production of thiols from cyclic terpene compounds, said process using readily available raw materials. Other objects will be apparent from the following description of the invention.

These objects are accomplished by the following invention which comprises catalytically hydrogenating a sulfurized cyclic terpene compound in the presence of a sulfactive hydrogenation catalyst. This reaction may be carried out in either the liquid or vapor phase and under a superatmospheric pressure and temperature, preferably at a pressure of at least 10 atmospheres and at a temperature within the range of about 75° C. to about 300° C.

The exact manner of practicing this invention will vary with the particular compounds processed; however, the following will illustrate its application: 100 parts of a sulfurized cyclic terpene compound either alone or dissolved in a suitable solvent, is mixed with 3 to 15 parts of a sulfactive hydrogenation catalyst of the type represented by cobalt and nickel sulfides and charged into a high pressure reaction vessel equipped with an inlet for hydrogen and an efficient device for agitation. Hydrogen under pressure is admitted to the vessel until the total pressure is above about 10 atmospheres, and preferably in the neighborhood of about 50 atmospheres, and the mixture is heated to between about 75° C. and 300° C. and generally between about 100° C. and 200° C. Under these conditions hydrogen is absorbed smoothly and, if necessary, additional amounts are added from time to time to maintain the pressure within a suitable working range. The absorption of hydrogen is usually complete within 2 to 5 hours. The reaction vessel is cooled to room temperature, purged to eliminate the hydrogen sulfide produced in the reaction, and the product is removed, filtered to separate the catalyst, and refined by fractional distillation or by any other appropriate method. According to this process, sulfurized cyclic terpene compounds are converted smoothly in good yields to thiols.

In the following examples the parts are given by weight.

Example I

Seventeen hundred fifty-six parts of alpha-pinene and 400 parts of sulfur are heated in an autoclave at 150° C. for 8 hours under autogenous pressure. The reaction mixture is cooled to room temperature and 75 parts of finely divided, reduced nickel catalyst is added. The mixture is then hydrogenated at 150° C. and 600 to 700 pounds per square inch. Under these conditions the reaction usually requires 8 to 9 hours, and the mixture is heated at 150° C. for 1 to 2 hours after the last pressure drop to insure a complete reaction. After cooling to room temperature, the catalyst is removed by filtration and the crude thiol derived from pinene fractionally distilled at 25 mm. pressure to obtain essentially pure thiol. The product boils at 114.5 to 114.6° C., refractive index $n_D^{26}$ 1.5024; total sulfur and mercaptan sulfur found 18.87%. This distilled material, on cooling to 0 to 5° C. for 24 hours yields large white crystals melting at 55° C. and a liquid residue. Both the crystalline mercaptan and the liquid fraction show strong absorption bands at wave lengths of 14.00; 12.65; 11.55; 11.30; 11.00; 10.65; 10.45; 10.15; 9.90; 9.60; 9.30; 9.10; 8.90; 8.75; 8.40; 8.20; 7.95; 7.65; 7.30; 7.20; 6.80; and 6.00 microns, when examined by infrared light in accordance with the method used for determining infrared absorption as described in an article by W. H. Avery, entitled, "Infrared spectrometer for industrial use," which appears in the J. Optical Soc. Am. 31, 633–638 (1941).

Example II

Seventeen hundred fifty-six parts of beta-pinene and 400 parts of sulfur are heated in an autoclave at 150° C. for 8 hours under autogenous pressure. The reaction mixture is cooled to room temperature and 75 parts of reduced nickel catalyst supported on kieselguhr are added. The mixture is then hydrogenated at 150° C. and 600 to 700 pounds per square inch. This reaction usually requires 8 to 9 hours, and the mixture is heated at 150° C. for 1 to 2 hours after the last pressure drop to insure a complete reaction. After cooling to room temperature, the catalyst is removed by filtration and the crude thiol derived from beta-pinene fractionally distilled at 25 mm. pressure to obtain essentially pure thiol. The product boils at 111 to 113° C.; refractive index $n_D^{26}$ 1.5044; sulfur found 18.85%.

*Example III*

Seventeen hundred fifty-six parts of dipentene and 400 parts of sulfur are heated in an autoclave at 150° C. for 8 hours under autogenous pressure. The reaction mixture is cooled to room temperature and 75 parts of finely divided, reduced nickel catalyst are added. The mixture is then hydrogenated at 150° C. and 600 to 700 pounds per square inch. This reaction usually requires 8 to 9 hours and the mixture is heated at 150° C. for 1 to 2 hours after the last pressure drop to insure a complete reaction. After cooling to room temperature the catalyst is removed by filtration and the crude thiol fractionally distilled at 25 mm. pressure to obtain essentially pure mercaptan and a higher boiling derivative containing two sulfur atoms, but only one mercaptan group per molecule. Boiling range of thiol 118 to 119° C.; refractive index $n_D^{26}$ 1.5188; sulfur found 18.96%. Boiling range of the higher boiling derivative 152 to 162° C.; refractive index $n_D^{26}$ 1.5459; sulfur found 30.34%.

*Example IV*

A thiol derived from terpinolene is prepared in a manner similar to Example III but employing terpinolene in place of dipentene. The thiol derived from terpinolene has the following physical characteristics: Boiling range 137 to 138° C.; refractive index $n_D^{26}$ 1.5340; sulfur found 19.08%.

*Example V*

A thiol derived from menthene is prepared in a manner similar to Example III but employing menthene in place of dipentene. The thiol has the following physical characteristics: Boiling range 116 to 122° C.; refractive index $n_D^{26}$ 1.4894; sulfur found 18.48%.

*Example VI*

A thiol derived from alpha-terpineol is prepared in a manner similar to Example III but employing alpha-terpineol in place of dipentene. The thiol derived from alpha-terpineol has the following physical characteristics: Boiling range 140 to 146° C.; refractive index $n_D^{26}$ 1.5176; sulfur found 18.12%.

*Example VII*

Five hundred forty-seven parts of camphene and 249 parts of sulfur are heated in a steel autoclave provided with agitation at 150° C. for 10 hours under autogenous pressure. The condensation mixture is cooled to room temperature and 40 parts of reduced nickel catalyst is added. The mixture then is hydrogenated at 150° C. and 600 to 700 pounds per square inch until hydrogen absorption is complete as shown by absence of further pressure drop. After cooling, the crude product is filtered to remove the catalyst and fractionally distilled at 25 mm. mercury pressure to obtain essentially pure thiol and a higher boiling derivative. The boiling range of the thiol is 115 to 118° C. A higher boiling liquid has a boiling range of 122 to 123.5° C.

*Example VIII*

Three hundred parts of verbenone is heated with 70 parts sulfur for 8 hours at 130 to 135° C. and then for 8 hours at 150° C. The sulfurized product is diluted with 500 parts benzene and 25 parts reduced nickel catalyst is added. The charge is reduced in an autoclave at 150° C. with hydrogen at 600 to 700 pounds per square inch until no more pressure drop occurs. The material is filtered from the catalyst and a thiol derived from verbenone recovered.

*Example IX*

One thousand eighty-eight parts of pinene, 246 parts of sulfur, and 55 parts reduced nickel catalyst are charged into an autoclave and heated for 8 hours at 170° C. Then hydrogen pressure at 500 pounds is placed on the autoclave and the reaction mass reduced until no further pressure drop occurs. This takes approximately 10 hours. The reaction mass is cooled and discharged, much hydrogen sulfide being evolved. The reaction mass is heated to 70° C. under vacuum with nitrogen passing over it until all the hydrogen sulfide is removed. Total weight of crude thiol derived from pinene is 1133 parts.

*Example X*

Three thousand sixty parts of alpha-pinene and 770 parts of sulfur are charged into a 4.5 liter steel autoclave and the mixture heated to 150° C. The charge is held at 150° C. for 8 hours and then cooled. One hundred fifty parts of a reduced nickel catalyst is added, the autoclave is swept with hydrogen and the charge hydrogenated under pressure of 400 to 500 pounds per square inch of hydrogen at 150° C. until no further pressure decrease occurs. The charge is cooled and the catalyst separated from the reaction mixture by filtration. Thirty-two hundred fifty parts of a product analyzing 14.13% sulfur is obtained; this corresponds to a 64% conversion to a thiol derived from pinene.

The temperature of sulfurization may be varied within wide limits prescribed by the reactivity and stability of the terpene on which the reaction is being carried out. Some terpenes are more active than others and will sulfurize at a lower temperature, whereas some sulfurized terpenes are more unstable than others and may not be heated beyond certain decomposition temperatures at which point hydrogen sulfide is evolved. In general, 150° C. has been found to be a satisfactory temperature for sulfurization. Additional details on the sulfurization of unsaturated compounds are disclosed in copending application of J. H. Werntz, Serial No. 392,136, filed May 6, 1941.

The sulfurized terpene compounds used in the practice of this invention are preferably those which are obtained by reacting elemental sulfur with terpene compounds in equimolar proportions. Higher proportions of sulfur to cyclic terpene compounds can be used; for example, ratios as high as 3:1 can be employed.

The temperature of hydrogenation may also be varied depending upon the catalyst employed, the hydrogen pressure, and the reactivity of the sulfurized terpene employed. Higher pressures may be advantageously employed if the equipment used is sufficiently strong. The invention contemplates the hydrogenation of sulfurized terpenes at superatmospheric temperatures and pressures either by batchwise or by continuous flow liquid phase methods. In general, the hydrogenation process of the invention may be best carried out in the liquid phase at pressures of at least 10 atmospheres and temperatures between about 100° C. and 200° C. For batchwise operations it has been found particularly convenient to employ pressures between about 20 and 300 atmospheres and temperatures of 150 to 165° C. In a continuous liquid phase process where the use of a solid stationary catalyst is involved the use of much higher pressures, of the order of 800 to 1000 atmospheres is beneficial.

In the practice of the invention, sulfurized terpene compounds may be hydrogenated either alone or dissolved in suitable solvents. If solvents are employed, inert materials of the type represented by benzene, toluene, xylene, petroleum ether, ligroin, and the like, are especially suitable. Alcohols, ethers, e. g. dioxane and even non-solvents such as water may be used as the reaction medium. It is preferable, however, to avoid the use of solvents wherever possible in view of the recovery problem and the attendant reduction in space-time yield and equipment efficiency. Additional operating details are disclosed in copending application of W. A. Lazier, F. K. Signaigo, and J H. Werntz, Serial No. 411,336, filed September 18, 1941.

In the practice of this invention any sulfactive hydrogenation catalyst may be used. Catalysts suitable for use in the process may be selected from the group of corrosion-resistant sulfactive materials comprising the sulfides and polysulfides of metals of groups I, VI, and VIII of the periodic table. Typical examples of catalyst compositions that are particularly efficient are the sulfides of cobalt, nickel, iron, molybdenum, tungsten, and chromium, and of these, the first four mentioned are preferred because of their high activity. These catalysts are conveniently prepared according to the methods described in copending applications of F. K. Signaigo, Serial No. 319,241, filed February 16, 1940, and Serial No. 319,242, filed February 16, 1940, and that of B. W. Howk, Serial No. 353,936, filed August 23, 1940. For example, efficient catalysts can be produced by precipitation methods in which a soluble salt of a metal such as cobalt is treated in solution with sodium or ammonium polysulfide. Particularly active catalysts are obtained by treating a pyrophoric hydrogenating metal with a sulfiding agent such as hydrogen sulfide, free sulfur or organic compounds of bivalent sulfur at moderate temperatures. As disclosed in the above examples, the latter process may be carried out conveniently in situ prior to the hydrogenation operation by charging the free metal together with the sulfurized terpene compound. The former will react with some of the sulfurized terpene compound with the formation of a sulfactive metal sulfide catalyst. The selection of a particular catalyst for the hydrogenation of sulfurized terpene compounds will depend principally upon the considerations of temperature and pressure to be employed in the hydrogenation process since some catalysts are active at lower temperatures than others. In general, the catalysts of this invention can be employed in the massive state or deposited on a suitable supporting material such as kieselguhr, pumice or activated charcoal. The catalysts may be used singly or in various combinations. For liquid phase, batch operations it is preferred to use between about 1 and 15 parts of catalyst in the form of finely divided powder for each 100 parts of sulfurized terpene compound. For continuous liquid phase hydrogenation, solid lumps or briquettes of suitable size and capable of withstanding erosion will be found desirable.

The cyclic terpene compounds employed include the monocyclic and unsymmetrical bicyclic terpenes or mixtures thereof. In place of the terpenes disclosed in the examples there may also be employed mixtures of terpenes such as are found in pine oils, turpentine, camphor oils, and such oils as are obtained as by-products in commercial processes for making camphor. The cyclic terpene compounds employed in Examples I, II, III, IV, V, VI, VII, and X had the following physical characteristics: The alpha-pinene had a distillation range between 156.2° C. and 157.7° C. with 90% distilling within the range of 156.3° C. to 157.0° C. It had a refractive index of $n_D^{20}$ 1.4652 and a specific gravity 15.5/15.5 of 0.8638. The beta-pinene had a distilling range of between 163.0° C. and 172.6° C. with 80% distilling between 164.0 and 167.0. This compound had a refractive index $n_D^{20}$ 1.4750 and a specific gravity 15.5/15.5 of 0.8714. The dipentene had a distilling range between 176.3° C. and 199.5° C. with 80% distilling between 177.5° C. and 181.7° C. This compound had a refractive index $n_D^{20}$ 1.4728, an iodine number of 258 and a specific gravity 15.5/15.5 of 0.8491. The terpinolene had a distilling range between 181.2° C. and 221.4° C. with 80% distilling between 182.8° C. and 193.4° C. This compound had an iodine number of 290.9. The menthene had a distilling range between 168.5° C. and 174.5° C. with 80% distilling between 169.1° C. and 170.5° C. This compound had a refractive index $n_D^{20}$ 1.4526 and an iodine number of of 208. The camphene had a distilling range between 157.3° C. and 160.1° C. with 80% distilling between 158.0° C. and 159.1° C. This compound had a refractive index $n_D^{20}$ 1.4950, a freezing point of 37.9° C. and a specific gravity 15.5/15.5 of 0.8366.

The thiols derived from the cyclic terpene compounds as obtained by the process of this invention are useful as flotation agents and as organic intermediates having a wide variety of uses in industry.

As many apparently widely different embodiments of this invention may be made without departing from the spirit and scope thereof, it is to be understood that this invention is not to be limited to the specific embodiments shown and described.

I claim:

1. The process for the preparation of thiols which comprises catalytically hydrogenating a sulfurized cyclic terpene compound in the presence of a sulfactive hydrogenation catalyst.

2. The process for the production of thiols which comprises reacting a sulfurized cyclic terpene compound with hydrogen at a superatmospheric temperature and pressure in the presence of a sulfactive hydrogenation catalyst.

3. The process for the production of thiols which comprises reacting a sulfurized cyclic terpene compound with hydrogen at a temperature between about 75° C. and about 300° C. in the presence of a sulfactive hydrogenation catalyst.

4. The process in accordance with claim 3 characterized in that the reaction is carried out at a pressure of at least 10 atmospheres.

5. The process which comprises sulfurizing a cyclic terpene compound and then catalytically hydrogenating said sulfurized cyclic terpene compound in the presence of a sulfactive hydrogenation catalyst.

6. The process for the production of thiols which comprises catalytically hydrogenating in the presence of a sulfactive hydrogenation catalyst a sulfurized cyclic terpene compound, said compound having been sulfurized with at least equimolar proportions of sulfur.

7. The process for the production of thiols which comprises catalytically hydrogenating a sulfurized bicyclic terpene compound in the presence of a sulfactive hydrogenation catalyst.

8. The process for the production of thiols which comprises catalytically hydrogenating a sulfurized pinene in the presence of a sulfactive hydrogenation catalyst.

9. A thiol derived from a cyclic terpene compound characterized in that said thiol is prepared by catalytically hydrogenating a sulfurized cyclic terpene compound in the presence of a sulfactive hydrogenation catalyst.

10. A thiol derived from a cyclic terpene compound characterized in that said thiol is prepared by catalytically hydrogenating in the presence of a sulfactive hydrogenation catalyst a sulfurized cyclic terpene compound, said compound having been sulfurized with at least equimolar proportions of sulfur.

11. A thiol derived from an unsymmetrical bicyclic terpene compound characterized in that it is prepared by catalytically hydrogenating a sulfurized unsymmetrical bicyclic terpene compound in the presence of a sulfactive hydrogenation catalyst.

12. A thiol derived from pinene characterized in that it was strong infrared absorption bands at the following wave lengths expressed in microns: 14.00; 12.65; 11.55; 11.30; 11.00; 10.65; 10.45; 10.15; 9.90; 9.60; 9.30; 9.10; 8.90; 8.75; 8.40; 8.20; 7.95; 7.65; 7.30; 7.20; 6.80; and 6.00.

JAMES H. WERNTZ.